United States Patent
Vignassa et al.

(10) Patent No.: US 7,328,574 B2
(45) Date of Patent: Feb. 12, 2008

(54) EXHAUST LINE AND MOTOR VEHICLE EQUIPPED THEREWITH

(75) Inventors: Philippe Vignassa, Vienne (FR); Franck Le Brazidec, Igny (FR)

(73) Assignees: Renault V.L., Saint Priest (FR); Renault S.A.S., Boulogne Billancourt (FR)

( * ) Notice: Subject to any disclaimer, the term of this patent is extended or adjusted under 35 U.S.C. 154(b) by 180 days.

(21) Appl. No.: 10/897,300

(22) Filed: Jul. 22, 2004

(65) Prior Publication Data

US 2004/0261404 A1 Dec. 30, 2004

Related U.S. Application Data

(63) Continuation of application No. PCT/EP03/50019, filed on Feb. 17, 2003.

(30) Foreign Application Priority Data

Feb. 25, 2002 (FR) .................. 02 02351

(51) Int. Cl.
*F01N 7/00* (2006.01)

(52) U.S. Cl. ............... 60/324; 60/272; 60/287; 60/292; 60/312; 181/254; 181/269; 181/272

(58) Field of Classification Search ............. 60/272, 60/287, 292, 297, 311, 312, 324, 313; 181/237, 181/241, 254, 269, 272
See application file for complete search history.

(56) References Cited

U.S. PATENT DOCUMENTS

| | | | |
|---|---|---|---|
| 4,916,897 A * | 4/1990 | Hayashi et al. ............... 60/286 |
| 4,926,636 A * | 5/1990 | Tadokoro et al. ............. 60/312 |
| 5,014,817 A * | 5/1991 | Takato et al. ................ 181/254 |
| 5,388,408 A * | 2/1995 | Lawrence ..................... 60/324 |
| 5,493,587 A * | 2/1996 | Komatsuda et al. .......... 60/284 |
| 5,655,367 A | 8/1997 | Peube et al. .................. 60/324 |
| 5,787,706 A * | 8/1998 | Smedler et al. ............... 60/288 |
| 6,349,541 B1 * | 2/2002 | Gruden et al. ................ 60/312 |
| 6,938,729 B2 * | 9/2005 | Womer et al. ............... 181/254 |

FOREIGN PATENT DOCUMENTS

| | | |
|---|---|---|
| DE | 3013444 | 10/1981 |
| DE | 4439705 | 5/1996 |
| EP | 0341832 | 4/1989 |
| EP | 0816648 | 1/1998 |
| FR | 2613089 | 9/1988 |
| JP | 2000257418 | 12/2000 |
| WO | WO94/01659 | 1/1994 |
| WO | WO00/34632 | 6/2000 |
| WO | WO00/74823 | 12/2000 |

* cited by examiner

*Primary Examiner*—Binh Q. Tran
(74) *Attorney, Agent, or Firm*—Jeff Rothenberg, Esq.; Heslin Rothenberg Farley & Mesiti P.C.

(57) ABSTRACT

The invention concerns an internal combustion engine exhaust line comprising an active noise reduction system with variable choke device, continuously regulated based on the instantaneous discharge rate pulses of exhaust gases exiting from the internal combustion engine, including an expansion chamber for closing phases of the variable choke device arranged upstream of said active noise reduction system and a cavity dispersing medium and high frequencies arranged downstream of the active noise reduction system. The expansion chamber for the closing phases of the variable choke device is integrated in a first depolluting system arranged upstream of said active noise reduction system.

14 Claims, 2 Drawing Sheets

EXHAUST LINE AND MOTOR VEHICLE EQUIPPED THEREWITH

CROSS-REFERENCES TO RELATED APPLICATIONS

This application is a continuation of international application PCT/EP03/50019 filed on Feb. 17, 2003 and published, in French, as international publication number WO 03/071104 A1 on Aug. 28, 2003, and claims priority from French patent application number 02.02351 filed on Feb. 25, 2002, the complete contents of these applications being incorporated herein by reference.

The present invention relates to an exhaust line, and an internal combustion engine equipped with such an exhaust line. It also relates to a vehicle incorporating such an engine.

Developments in pollution control and sound emission standards for road vehicles are tending to become increasingly severe. In particular, in the field of industrial vehicles, future pollution control regulations will impose increasingly constraining and bulky treatment systems.

Firstly, these new treatment systems represent significant volumes that are added to the volumes of the mufflers already in existence. These new treatment systems will have to be incorporated and taken into account in terms of the architecture of the body and of the vehicle.

Secondly, the addition of new treatment systems on the exhaust line will cause additional pressure losses, which can have a major and unfavorable impact on engine performance in terms of power and hence of fuel consumption.

PRIOR ART

Systems for removing solid particulates discharged by the combustion engine are known from documents EP-0 341 832 and WO-00/34 632.

Systems for reducing $NO_x$ nitrogen oxide gases are also known from document WO-00/74 823.

An active noise reduction system of the variable choke device type is known from document FR-2 613 089, the device being regulated as a function of the instantaneous discharge rate pulses of the exhaust gases exiting the internal combustion engine.

However, all the systems which serve to perform the sound intensity and antipollution treatment functions are designed as separate systems. These systems are chosen and tested separately and in isolation, and are hence never combined together.

An exhaust line is known from document WO-94/01 659, comprising in succession, from the engine, a catalyst pollution control system followed by an active noise reduction system of the variable choke device type.

An exhaust line is known from document DE-44 39 705, comprising in succession from the engine, a catalyst pollution control system followed by an active noise reduction system of the variable choke device type and terminating in a passive muffler.

However, these lines do not completely and comprehensively solve the problems of pollution by the exhaust gases emitted, particularly the removal of solid particulates, and the problems of reducing sound emissions. Moreover, these lines are not optimized from the standpoint of size, weight and back pressure, causing pressure losses.

SUMMARY OF THE INVENTION

It is a first aspect of the invention to design an exhaust line that is particularly effective simultaneously in terms of reducing sound emissions and of decontaminating the discharge gasses produced by combustion. A second aspect of the invention is to develop an exhaust line of which the total volume is smaller than the sum of the volumes of the various component systems. A third aspect of the invention is to provide an exhaust line with various pollution control and sound intensity reduction systems, optimized in order to minimize the pressure losses. A fourth aspect of the invention is to mount, as regards an internal combustion engine and a vehicle, an exhaust line that is particularly effective in terms of reducing sound and pollutant emissions and improving engine performance.

An exhaust line for internal combustion engine comprises an active noise reduction system of the variable choke device type, regulated continuously as a function of the instantaneous discharge rate pulses of the exhaust gases from the internal combustion engine, presenting an expansion chamber for the closing phases of the variable choke device placed upstream of said active noise reduction system, and a cavity dispersing the medium and high frequencies placed downstream of said active noise reduction system.

According to a first aspect of the invention, the exhaust line is characterized in that the expansion chamber for the closing phases of the variable choke device is incorporated in a first pollution control system placed upstream of said active noise reduction system.

The invention succeeds in simultaneously combining a noise reduction system with a pollution control system. The principle of the invention is to succeed in reducing the total volume of the line by incorporating at least one useful volume necessary for optimal functioning of the choke device from the acoustic standpoint. This is achieved within a system responsible for exhaust gas pollution control. In other words, a portion of the volumes of the systems responsible for exhaust gas pollution control is used as a volume for optimizing the operation of the active noise reduction system. The expansion chamber or the dispersing cavity are thus incorporated in a system responsible for exhaust gas pollution control placed upstream or downstream of the active noise reduction system of the variable choke device type.

This exhaust solution generates a synergy between the pollution control system and the noise reduction system. The number of volumes present is reduced and the line architecture is optimized by reducing both weight and size. Furthermore, engine performance is optimized by decreasing the engine back pressure compared to an exhaust line with simply juxtaposed systems and volumes.

In a first embodiment, the first pollution control system placed upstream can be a solid-particulate removal system. Particularly advantageously, the expansion chamber for the closing phases of the variable choke device of the active noise reduction system can be incorporated in the solid-particulate removal system between a catalyst and a particulate filter.

For optimal pollution control of the discharge gases, the exhaust line can further comprise a second pollution control system placed downstream of the active noise reduction system. In this case, the cavity dispersing the medium and high frequencies can be incorporated in the second pollution control system placed downstream.

If the first pollution control system placed upstream is a solid-particulate removal system, the second pollution control system placed downstream can accordingly be an $NO_x$ nitrogen oxide gas reduction system. The cavity dispersing the medium and high frequencies can advantageously be incorporated into the $NO_x$ nitrogen oxide gas reduction system after a catalyst commonly denoted $DeNO_x$.

In a second preferred embodiment, the first pollution control system placed upstream can be an $NO_x$ nitrogen oxide gas reduction system. For optimal pollution control of the discharge gases, the exhaust line can further comprise a second pollution control system placed upstream of the first pollution control system.

If the first pollution control system placed upstream is an $NO_x$ nitrogen oxide gas reduction system, the second associated pollution control system can accordingly be a solid-particulate removal system.

In the first and the second embodiments and for optimal pollution control, the $NO_x$ nitrogen oxide gas reduction system can be of the urea injection type followed by a catalyst commonly denoted $DeNO_x$.

According to a second aspect of the invention, an internal combustion engine is characterized in that it is connected to at least one exhaust line as described above.

According to a third aspect of the invention, a motor vehicle is characterized in that it comprises at least one exhaust line as described above.

DESCRIPTION OF THE DRAWINGS

The invention will be better understood and its various advantages and different features will become more apparent from the following description of the non-limiting illustrative embodiment, with reference to the appended schematic drawings, in which.

DETAILED DESCRIPTION

Figure 1:
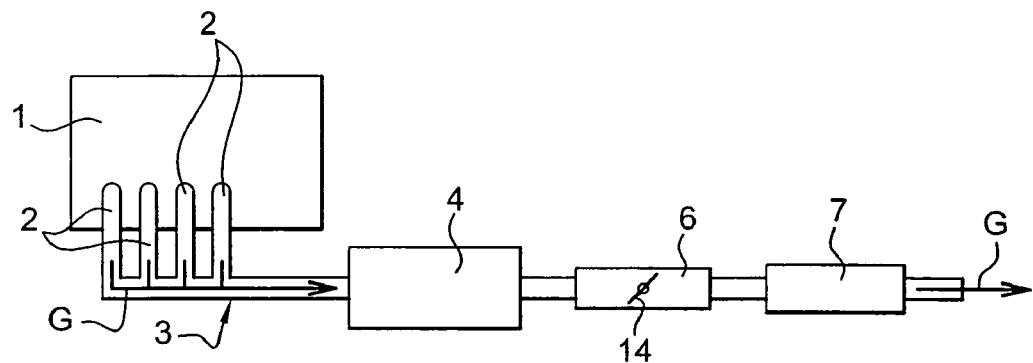
FIG. 1 is a simplified diagram of a first embodiment of the exhaust line according to the invention.
Figure 2:
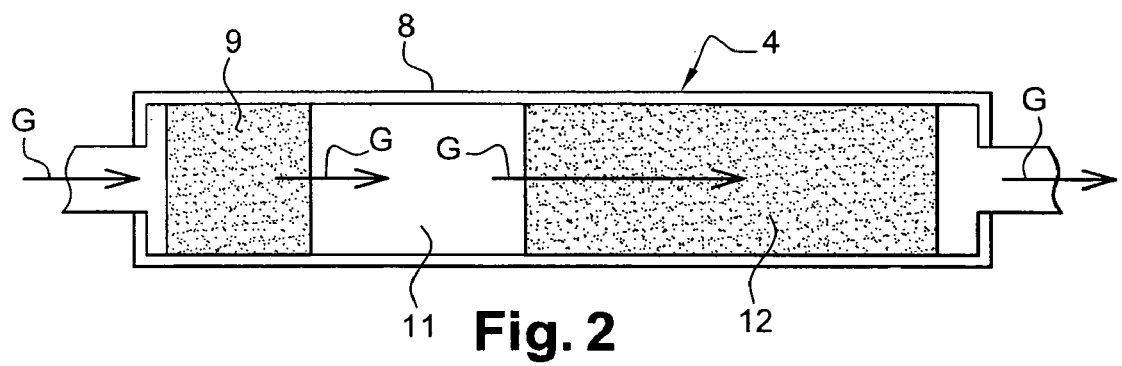
FIG. 2 is a simplified diagram of the particulate removal system.
Figure 3:
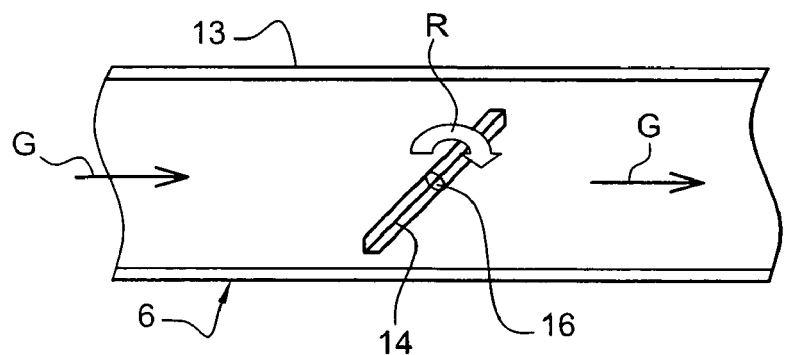
FIG. 3 is a simplified diagram of the active noise reduction system.
Figure 4:
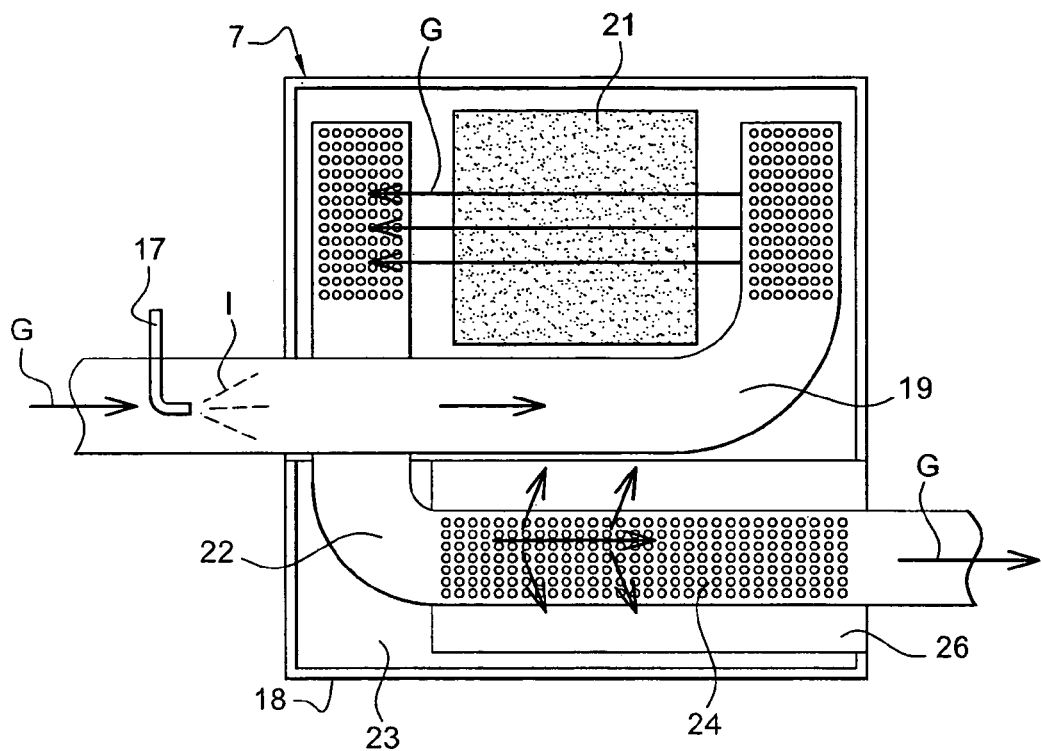
FIG. 4 is a simplified diagram of the $NO_x$ nitrogen oxide gas reduction system.

A motor vehicle (not shown) comprises an internal combustion heat engine (1), for example of the turbodiesel type, generating acoustic and pollutant gas emissions. The discharge rate pulses of the pollutant gases are collected by the different exhaust manifolds (2) and conveyed via the exhaust line (3).

An exhaust line (3) according to a first embodiment according to the present invention (see FIGS. 1 to 4) is simultaneously responsible for decontaminating the discharge gases and reducing the sound intensity. The exhaust line (3) comprises, disposed in line and in succession on the route followed by the exhaust gases (arrows G), a first pollution control system (4) responsible for removing the solid particulates, an active system, that is an active valve or active nozzle (6) responsible for reducing the noise, and a second pollution control system (7) responsible for reducing the concentration of $NO_x$ nitrogen oxide gases.

The first pollution control system (4) is located furthest upstream of the exhaust gas exit. This first pollution control system (4) plays the dual role of particulate filter and of expansion chamber for the exhaust gases during active noise regulation by the active nozzle (6) placed further downstream. The particulate filter permits contamination and removal of the solid soot particles, for example fuel component residues, lubricating oil, etc.

The first pollution control system (4) comprises (see in particular FIG. 2) within the same casing (8), disposed in line and in succession on the route followed by the exhaust gases (arrows G), a catalyst (9), the exhaust gas expansion chamber (11) and a particulate filter (12).

This first pollution control system (4) is designed and operates according to the principle of the CRT® ("Continuously Regenerating Trap") system, as described in document EP-0 341 832. It will be observed that this first pollution control system (4) can be based on and can operate according to other principles, of which an example is described in document WO-00/34 632.

The catalyst (9) is loaded with platinum and permits oxidation of the NO nitrogen oxide gases to $NO_2$ gas. The $NO_2$-enriched exhaust gases are then used at the inlet of the particulate filter (12) to carry out a low temperature combustion of the carbon in the soot and a continuous regulation of the particulate filter (12), thereby preventing its clogging.

At the outlet of the first pollution control system (4), the exhaust gases then pass into the active nozzle (6) responsible for reducing noise. This active nozzle (6) is of the variable choke type (see in particular FIG. 3). It comprises a cylindrical duct (13) responsible for channeling the exhaust gas flow (arrows G) and a flap (14) of substantially circular shape fixed to and oscillating (arrow R) about a shaft (16) that is integral with the cylindrical duct (13).

The cylindrical duct (13) is equipped with at least one sensor (not shown) for measuring the characteristic physical quantity of the instantaneous gas discharge rate. The flap (14) plays the role of the variable choke of the cross section of the gas passage duct (13) and closes the cylindrical duct (13) as a function of the quantity measured by the sensor or sensors. When the flap (14) is in the partially closed position, the gases are instantaneously stored in the exhaust gas expansion chamber (11).

The flap (14) oscillates at the same frequency as the discharge rate pulses, but in phase opposition, thereby creating a second source of discharge rate pulses canceling out the first, thereby providing an attenuation of the low-frequency harmonic component of the flow. This active nozzle (6), its principle and its operating mode are described, for example, in documents FR-2 613 089, WO-94/01 659 and DE-44 39 705.

At the outlet of the active nozzle (6), the exhaust gases then enter the second system (7) responsible in particular for reducing the $No_x$ nitrogen oxide gas concentration by catalysis. The anti-$No_x$ treatment, also known by the name of "$DeNO_x$", is carried out by catalysis as described, for example, in document WO-00/74 823. This pollution control is combined with acoustic treatment of the medium and high frequencies according to the principle of the dissipative passive muffler, also described in document WO-94/01 659 (see in particular FIG. 4).

An injector (17) of urea or ammonia (I) is first positioned at the inlet of the second system (7) and serves to reduce the $NO_x$ nitrogen oxide gases, chiefly NO and $NO_2$, to $N_2$. The second system (7) then comprises within the same casing (18), disposed in line and in succession on the route followed by the exhaust gases (arrows G), an inlet duct (19), a so-called "$DeNo_x$" urea catalyst (21), an intermediate duct (22), a passive or dissipative muffler (23) presenting a channel with multiple perforations (24) terminating on a porous material (26) presenting acoustic properties absorbing the medium and high frequencies. It will be observed that the dissipative muffler (23) is placed right at the end of the exhaust line for reasons of greater efficiency. In fact, each of the components preceding it, the urea injector (17) and the DeNo$_x$ catalyst (21), is still liable to generate medium and high frequency sound that has to be eliminated.

At the outlet of this second system (7) and also at the exit of the exhaust line (3), the gas flow is therefore smoothed and treated in terms of noise and pollutant emissions.

A comparison of the volumes was then carried out. For a truck having a 12-liter cylinder displacement engine developing 500 HP, the volume of each of the components considered separately is:

- 55 l for the particulate removal system (4);
- 20 l for the expansion chamber (11) for the closing phases of the choke device (14);
- 0 l for the active noise reduction system (6);
- 40 l for the urea tank;.
- 70 l for the DeNO$_x$ catalyst (21); and
- 20 l for the cavity dispersing the medium and high frequencies (23);
  - making a total of 205 liters, or 165 liters not including the urea tank.

With the present invention, and for the same truck, the volume of the exhaust line (3) will be:

- 60 l for the particulate removal system (4) incorporating the expansion chamber (11) for the closing phases of the choke device (14);
- 0 l for the active noise reduction system (6);
- 40 l for the urea tank; and
- 75 l for the DeNO$_x$ catalyst (21) incorporating the cavity dispersing the medium and high frequencies (23);
  - making a total of 175 liters, or 135 liters not including the urea tank.

This second total should be compared to the previous total of 205 liters, or 165 liters without the urea tank, thereby demonstrating that the exhaust line according to the invention offers a significant gain in volume and hence in size and weight once it is mounted.

Figure 5:
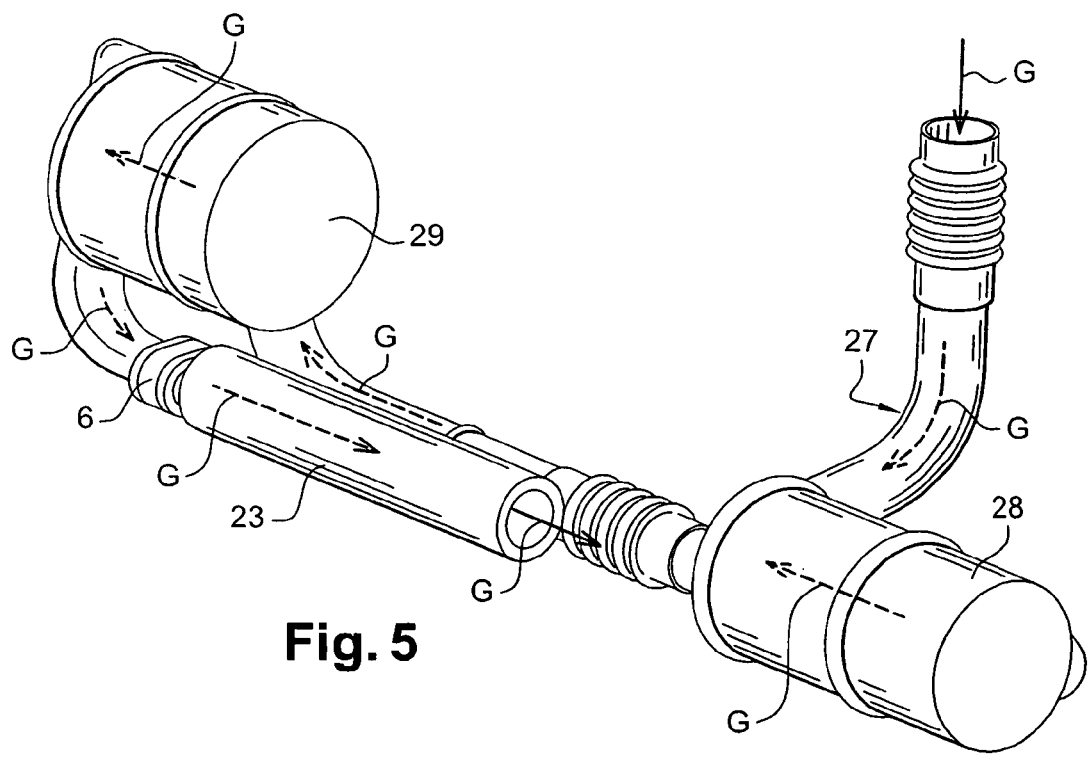
FIG. 5 is a perspective view of a second embodiment of the exhaust line according to the invention.

The exhaust line (27) according to a second preferred embodiment according to the present invention (see FIGS. 3 and 5) is simultaneously responsible for decontaminating the discharge gases and reducing the sound intensity. The exhaust line (27) comprises, disposed in line and in succession on the route followed by the exhaust gases (arrows G), a first pollution control system (28) responsible for removing the solid particulates, a second pollution control system (29) responsible for reducing the concentration of No$_x$ nitrogen oxide gases, an active system, that is an active valve or active nozzle (6) responsible for reducing the noise, and a tubular passive muffler. The first pollution control system (28) is located furthest upstream from the exhaust gas outlet. This first pollution control system (28) is a particulate filter it permits pollution control and removal of the solid soot particles, for example, residues of fuel components, lubricating oil, etc. As already described above for the first embodiment, this first pollution control system (28) is based on and operates according to the principle of the CRT® ("Continuously Regenerating Trap") system as described in document EP-0 341 832. T will be observed that this first pollution control system (28) can be based on and can operate according to other principles, an example of which is described in document WO-00/34 632.

At the outlet of the first pollution control system (28), the exhaust gases then pass into the second system (29) responsible in particular for reducing the concentration of NO$_x$ nitrogen oxide gases by catalysis. As already described above for the first embodiment, the anti-NO$_x$ treatment, also known by the name of "DeNo$_x$", is based on and carried out by catalysis as described, for example, in document WO-00/74 823.

This second pollution control system (29) plays the dual role of NO$_x$ nitrogen oxide reducer and of expansion chamber for the exhaust gases during active noise regulation by the active nozzle (6) placed further downstream. The second pollution control system (29) accordingly comprises, within the same casing, a so-called "DeNO$_x$" urea catalyst and the expansion chamber of the exhaust gases.

At the outlet of the second pollution control system (29), the exhaust gases then pass into the active nozzle (6) responsible for reducing the noise. As already described above for the first embodiment, this active nozzle (6), its principle and its operating mode are described, for example, in documents FR-2 613 089, WO-94/01 659 and DE-44 39 705.

At the outlet of the active nozzle (6), the exhaust gases finally enter the dissipative muffler (23) with porous material. As already described above for the first embodiment, pollution control is combined with an acoustic treatment of the medium and high frequency components according to the principle of the dissipated passive muffler, as also described in document WO-94/01 659. It will be observed that the dissipative muffler (23) is placed in complete isolation at the end of the exhaust line (27) for reasons of greater efficiency.

At the outlet of this dissipative muffler (23) and also at the outlet of the exhaust line (27), the gas flow is therefore smoothed and treated in terms of noise and pollutant emissions.

The present invention is not limited to the embodiments described and illustrated. Numerous modifications can be made without actually departing from the context defined by the scope of the claims.

The invention claimed is:

1. An exhaust line for internal combustion engine comprising
   an active noise reduction system including a variable choke device, regulated continuously as a function of instantaneous discharge rate pulses of exhaust gases from the internal combustion engine,
   an expansion chamber for closing phases of the variable choke device placed upstream of said variable choke device of the active noise reduction system, and
   a cavity dispersing medium and high frequencies placed downstream of said active noise reduction system,
   wherein the expansion chamber for the closing phases of the variable choke device is incorporated in a casing of a first pollution control system placed upstream of said active noise reduction system.

2. The exhaust line as claimed in claim 1, wherein the first pollution control system placed upstream is a solid-particulate removal system.

3. The exhaust line as claimed in claim 2, wherein the expansion chamber for the closing phases of the variable choke device of the active noise reduction system is incorporated in the solid-particulate removal system between a catalyst and a particulate filter and the exhaust gases flow in succession past the catalyst, through the expansion chamber and then through the filter.

4. The exhaust line as claimed in claim 1, further comprising a second pollution control system placed downstream of the active noise reduction system.

5. The exhaust line as claimed in claim 4, wherein the cavity dispersing the medium and high frequencies is incorporated in the second pollution control system placed downstream.

6. The exhaust line as claimed in claim 4, wherein the second pollution control system placed downstream is an $NO_x$ nitrogen oxide reduction system.

7. The exhaust line as claimed in claim 6, wherein the cavity dispersing the medium and high frequencies is incorporated after a $DeNo_x$ catalyst.

8. The exhaust line as claimed in claim 1, wherein the first pollution control system placed upstream is an $No_x$ nitrogen oxide reduction system.

9. The exhaust line as claimed in claim 8, further comprising a second pollution control system placed upstream of the first pollution control system.

10. The exhaust line as claimed in claim 9, wherein the second pollution control system is a solid-particulate removal system.

11. The exhaust line as claimed in claim 6, wherein the $NO_x$ nitrogen oxide reduction system is of a urea injection type followed by a $DeNO_x$ catalyst.

12. An internal combustion engine, connected to at least one exhaust line as claimed in claim 1.

13. A motor vehicle, including at least one exhaust line as claimed in claim 1.

14. The exhaust line as claimed in claim 1, wherein the expansion chamber comprises a chamber wherein the gases are instantaneously stored during closing phases of the variable choke device.

* * * * *

UNITED STATES PATENT AND TRADEMARK OFFICE
CERTIFICATE OF CORRECTION

PATENT NO. : 7,328,574 B2  Page 1 of 1
APPLICATION NO. : 10/897300
DATED : February 12, 2008
INVENTOR(S) : Vignassa et al.

It is certified that error appears in the above-identified patent and that said Letters Patent is hereby corrected as shown below:

Title Page, Item (73)

In the Assignees:

Please delete "Renault V.L." and -- Renault V.I. --

Signed and Sealed this

Seventeenth Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,328,574 B2  Page 1 of 1
APPLICATION NO. : 10/897300
DATED : February 12, 2008
INVENTOR(S) : Vignassa et al.

It is certified that error appears in the above-identified patent and that said Letters Patent is hereby corrected as shown below:

Title Page, Item (73)

In the Assignees:

Please delete "Renault V.L." and insert -- Renault V.I. --

This certificate supersedes the Certificate of Correction issued June 17, 2008.

Signed and Sealed this

Third Day of February, 2009

JOHN DOLL
*Acting Director of the United States Patent and Trademark Office*